United States Patent [19]

Bertrand et al.

[11] 3,995,783
[45] Dec. 7, 1976

[54] YIELDABLE SHEAR BAR FOR A FORAGE HARVESTER

[75] Inventors: Raymond Bertrand; Claude Barbot; Robert Guilhermic, all of Senonches, France

[73] Assignee: Deere & Company, Moline, Ill.

[22] Filed: Sept. 4, 1975

[21] Appl. No.: 610,310

[30] Foreign Application Priority Data

Sept. 13, 1974 France .................... 74.31114

[52] U.S. Cl. .................. 241/222; 83/583; 241/239; 241/290
[51] Int. Cl.² ........................ B02C 18/16
[58] Field of Search .......... 241/221, 222, 239, 241, 241/287, 289, 290; 83/583

[56] References Cited
UNITED STATES PATENTS

| | | | |
|---|---|---|---|
| 1,302,398 | 4/1919 | Mangini | 83/583 X |
| 1,634,219 | 6/1927 | Smith | 241/241 X |
| 2,130,473 | 9/1938 | Ruau | 83/583 |
| 2,172,886 | 9/1939 | Gabel | 241/289 X |
| 3,117,735 | 1/1964 | Fourey | 241/239 |
| 3,126,931 | 3/1964 | Blanshine et al. | 241/222 UX |
| 3,552,463 | 1/1971 | Witt | 241/222 |

*Primary Examiner*—Granville Y. Custer, Jr.
*Assistant Examiner*—Howard N. Goldberg

[57] ABSTRACT

A forage harvester has a cylinder type cutterhead and a plurality of feed rolls that feed crop material radially into the cutterhead over a shear bar normally positioned adjacent to the cutterhead in registry therewith. The shear bar is mounted for resilient yieldable deflection when the cutterhead strikes a foreign object to a deflected position wherein it permits the tangential expulsion of the foreign object at the shear bar.

9 Claims, 8 Drawing Figures

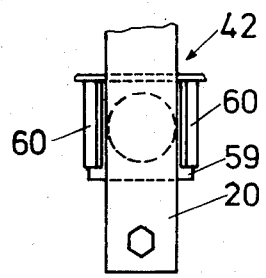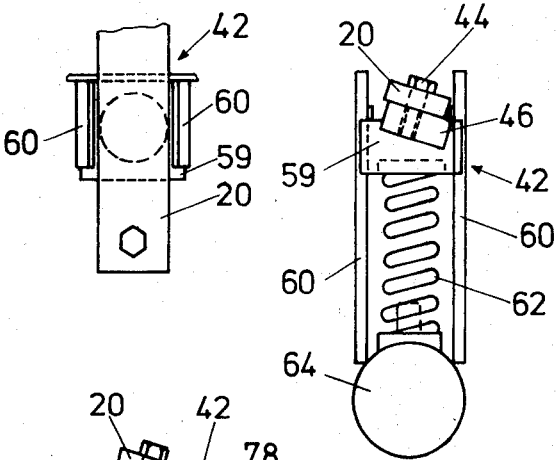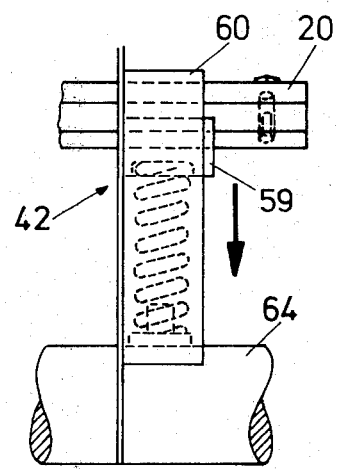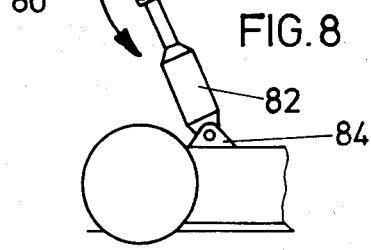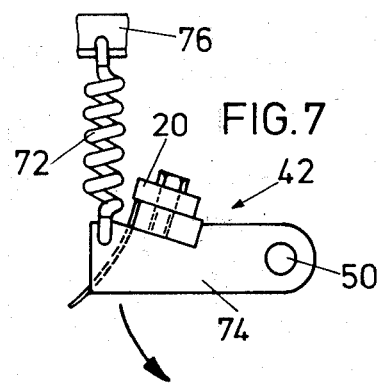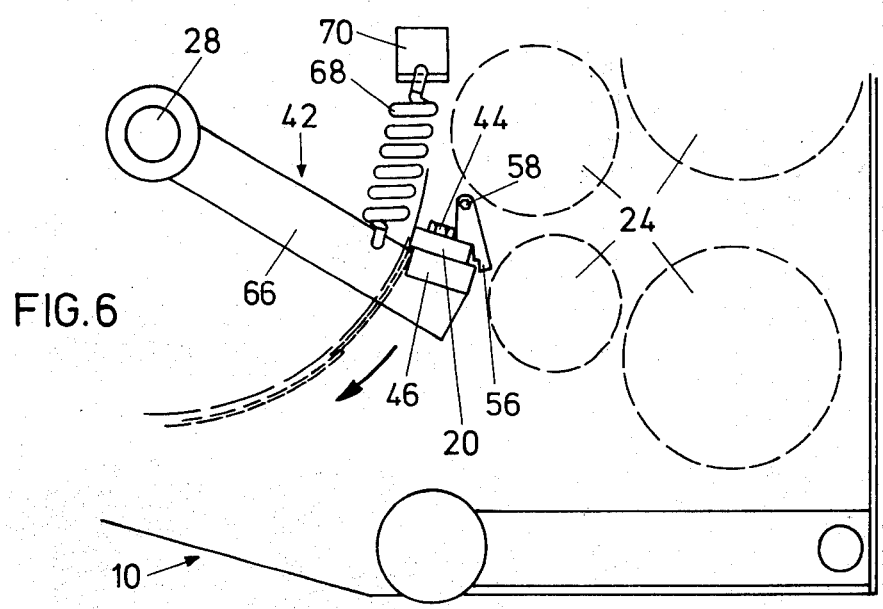

12345678# YIELDABLE SHEAR BAR FOR A FORAGE HARVESTER

BACKGROUND OF THE INVENTION

This invention relates to a forage harvester having a rotary cutterhead and a shear bar aligned therewith for the cutting of crop material between the cutterhead and the shear bar, the shear bar being movable away from the cutterhead to a deflected position to accommodate hard foreign bodies lodged between the cutterhead and the shear bar, and the shear bar being biased to its undeflected position.

An apparatus having similar features is disclosed in German Patent or Auslegeschrift 1,268,422 in which the shear bar is maintained in its undeflected position by a spring-loaded locking member which is forced aside when the shear bar is deflected by a hard body, such as a stone, which has found its way with the crop to the cutterhead. After overcoming the spring-loading on the locking device in this way, the shear bar is free of the locking member and the cutting action ceases. Before cutting can be restarted, the shear bar must be moved manually back to its undeflected position and the locking member must be reset in its original position.

This is clearly a time-consuming procedure and the present invention enables considerable time to be saved.

SUMMARY OF THE INVENTION

According to the present invention a bias acts on the shear bar is fully deflected position thereof, to bias it toward its undeflected position.

Thus, if a stone is trapped between the cutterhead and the shear bar, the shear bar will simply move against the bias to a deflected position, allowing the stone to free itself, and then normally return under the action of the bias back to its undeflected position, whereby there is no need for any stopping of the cutterhead nor any time-consuming manual return of the shear bar.

The shear bar can be arranged so that after a predetermined deflection it is engageable with a tooth of a ratchet arm to hold it spaced from its original undeflected position, while still under the influence of the bias.

BRIEF DESCRIPTION OF THE DRAWINGS

Several embodiments of a forage harvester cutter bar assembly according to the invention will now be described with reference to the accompanying diagrammatic drawings in which:

FIG. 3 is a plan view of an end portion of a second forage harvester cutter bar assembly according to the invention;

FIG. 4 is a vertical cross section in the longitudinal direction of the forage harvester through the cutter bar assembly of FIG. 3;

FIG. 5 is a transverse vertical cross section through the cutter bar assembly of FIG. 3;

FIG. 6 is a longitudinal cross section similar to FIG. 1, but through a third embodiment of a cutter bar assembly according to the invention;

FIG. 7 is a longitudinal cross section of a fourth embodiment of a cutter bar assembly according to the invention; and FIG. 8 is a cross section similar to FIG. 7, but of a fifth embodiment of a cutter bar assembly according to the invention.

DESCRIPTION OF THE PREFERRED EMBODIMENTS

Figure 1:
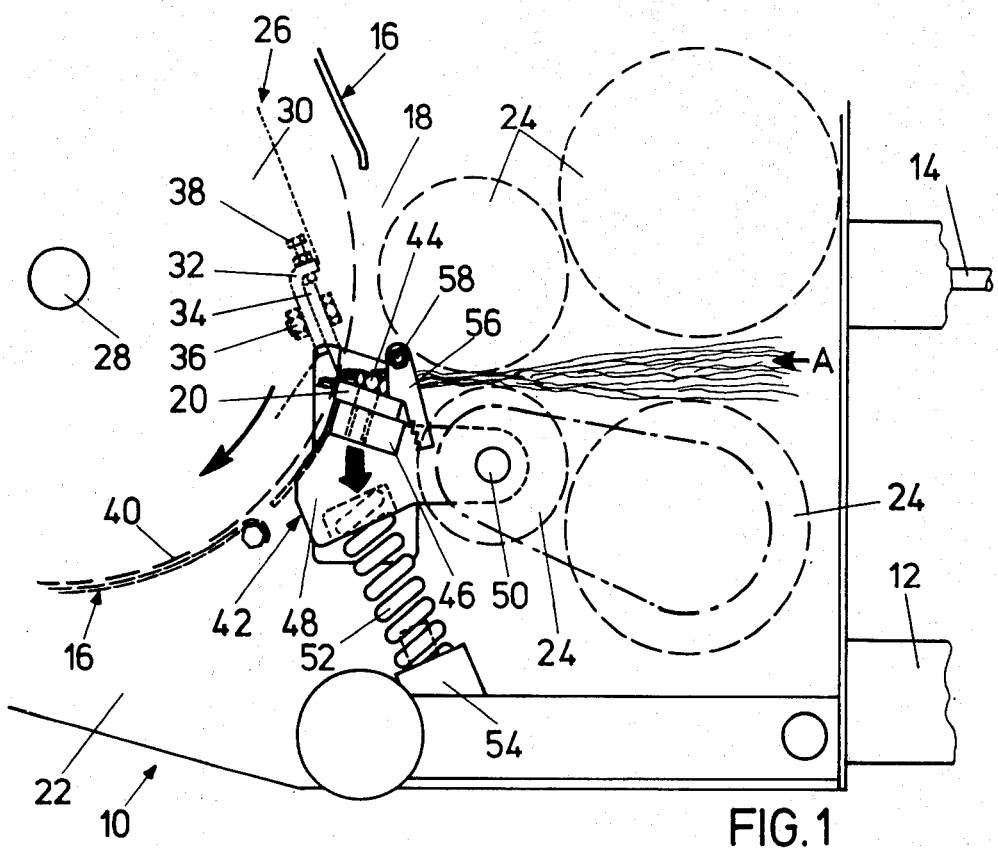
FIG. 1 is a cross section through a first embodiment of a forage harvester cutter bar assembly according to the invention, taken in a longitudinal direction thereof.

In the figures similar parts have similar reference numerals.

The forage harvester in which the above cutter bar assemblies are mounted is conventional (apart from the assemblies) and therefore will be described only in broad outline. The forage harvester has a mobile main frame 10, and is mounted on a pair of wheels (not shown). The main frame 10 includes a forwardly extending draw bar 12, which is connectible to a tractor in a conventional manner, the harvester being powered from the tractor PTO by a fore-and-aft extending drive shaft 14.

A cutterhead housing 16, which is shown only in part, is mounted on the right side of the frame 10 and has a forward inlet opening 18 of which the lower extremity is defined by a transversely extending shear bar 20. The rear portion of the housing 16 is formed by a removable upwardly extending inspection cover, and the sides by vertical plates 22. Two pairs of axially transverse cooperating feed rolls 24 are mounted in a feed roll housing (not shown) immediately in front of the cutterhead housing 16, and a harvesting attachment (also not shown) for removing crop from the field and delivering it to the feed rolls 24, is mountable on the front of the feed roll housing in a conventional way. The crop passes, in the direction indicated by the arrow A in FIG. 1, between the cooperating rolls 24 which deliver it rearwardly through the inlet opening 18 over the shear bar 20 in a generally radial direction into a rotating cylinder- or reel-type cutterhead indicated in its entirety by the numeral 26. The cutterhead 26 reduces the crop as it passes over the shear bar 20 and propels it rearwardly to an upwardly extending discharge chute (not shown) having a rear wall to the bottom of which the inspection cover is attached. The chute, in turn, delivers the reduced crop to a trailing collector vehicle.

The cutterhead 26 includes an axial shaft 28 which is journaled in a bearing on each of the side plates 22 and which is connected to the shaft 14 through a known type of drive mechanism (not shown) and is driven thereby in a clockwise direction as viewed in FIG. 1. A pair of flat hexagonal spaced-apart flanges 30 (shown in part only) are mounted on the cutterhead shaft 28 and carry at their peripheries supports 32 on their six sides for six knives 34 (although the chosen number of knives and their supports can be varied). One knife only and its support on a side of a single flange is shown. The supports 32 extend across the cutterhead 26 at a small angle, i.e. about 10 degrees, to the cutterhead axis, the knives 34 being attached to radially-outer faces of the supports 32 by bolts 36. Each support 32 has an upturned portion through which an adjusting screw 38 passes to abut the edge, of the associated knife 34, which is parallel to the cutting edge. The knives 34 are thus arranged to trace a cylinder, indicated by the broken line 40, the diameter of which can be altered by adjustment of the screws 38 after loosening the bolts 36.

Stones or other hard objects are from time to time introduced into the forage harvester with the crop and travel with the crop to the inlet opening 18 of the cutterhead housing 16 where they may be caught between one of the rotating knives 34 and the shear bar 20. The shear bar 20 is part of a shear bar assembly 42 which is designed so that the shear bar is movable, in each of the five embodiments, away from its operative position in the drawings against a bias as will hereinafter be described. This movement allows the shear bar 20 to accommodate such hard objects with only a low risk of damage to the bar or to the knives 34, and allows the bar to automatically return to its operative position immediately after the object has passed.

The five shear bar assemblies 42 will now be described in detail.

Figure 2:
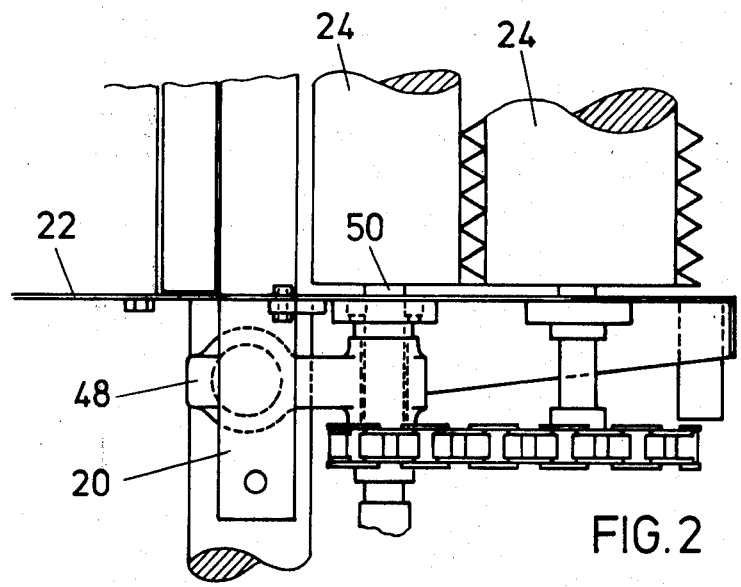
FIG. 2 is a top plan view of an end portion of the assembly of FIG. 1.

The shear bar 20 of the assembly 42 of FIGS. 1 and 2 is attached by bolts 44 to a support bar 46 which extends transversely immediately under the shear bar and which is itself rigidly attached at each end portion to a pivot arm 48 disposed just outside the respective vertical plates 22. The pivot arms are each pivotally received on a trunnion 50 for the lower rearward feed roll, the two trunnions being mounted in, and passing through, the plates 22. The pivot arms 48 are biased toward their operative positions in FIG. 1 each by a helical compression spring 52 received at its upper end in a recess of the associated pivot arm 48 and having its lower end anchored to a bracket 54 on the main frame 10.

A pair of ratchet arms 56 is associated with the shear bar 20. Each arm 56 hangs downwardly from a pivot pin 58 mounted on the feed roll housing and has an abutment shoulder with which the upper face of the forward portion of the shear bar 20 comes into contact under the influence of the spring 52 in the operative position of the bar 20. Lower down the ratchet arm 56 is a number of ratchet teeth which hold the pivot arm 48 against return to the original operative position if the deflection of the shear bar 20 is sufficient to bring the upper edge of its forward portion into engagement with one of the teeth.

It will be apparent that when a hard object becomes lodged between one of the knives 34 and the shear bar 20 the rotating knife will force the two pivot arms 48 to turn in an anticlockwise direction (as viewed in FIG. 1) about the trunnions 50 and against the action of the compression spring 52 thereby minimizing any damage of the knife 34 and the bar 20.

Turning now to the second cutter bar assembly, i.e. to FIGS. 3 to 5, the support bar 46 is here mounted on a pair of slides 59 which take the place of the pivot arms 48 of the first embodiment of FIGS. 1 and 2. The slides 59 are each received on two vertical guide plates 60 and a vertical compression spring 62, having its upper end received in a recess on the underside of each slide 59 and its lower end anchored to a transverse bar 64, biases the associated slide 59 upwardly in its normal position against the shoulder of a ratchet arm 56 (not shown in FIGS. 3 to 5) in the same manner as described above in relation to the first embodiment.

The third cutter bar assembly, shown in FIG. 6, is somewhat similar to the first except that pivot arms 66 are substituted for the two pivot arms 48 in FIGS. 1 and 2 and are pivotally mounted in this instance on the cutterhead shaft 28. Helical tension springs 68 replace the two compression springs 52 and each is attached at its lower end to the top portion of the associated pivot arm 66 and its upper end to a bracket 70 attached to the cutterhead housing 16 so that the pivot arm 66 when in its normal position is biased upwardly into abutment with the shoulder of the ratchet arm 56.

The fourth cutter bar assembly (FIG. 7) again relies on helical tension springs 72 to load pivot arms 74 and, as in FIGS. 1 and 2, the arms are pivotally mounted on the trunnions 50. Each spring 72 has its upper end engaged with a bracket 76 on the cutterhead housing 16 and its lower end attached to the rearward upper end portion of its respective pivot arm 74.

Lastly, pivot arms 78 of the fifth cutter bar assembly, as shown in FIG. 8, are biased by hydraulic means. Each pivot arm 78 has a projection 80, at its lower side portion, extending downwardly to which the piston of a piston and cylinder unit 82 is pivotally attached, while the cylinder of the unit 82 is similarly attached to a bracket 84 on the main frame 10.

In the above embodiments of FIGS. 3 to 8 it will readily be seen that the cutter bar assemblies 42 operate in a basically similar manner as described in relation to the assembly of FIGS. 1 and 2. Thus, when a hard object is encountered between a knife 34 and the shear bar 20 to the two slides 59 or the two pivot arms 66 or 74 or 78 move against the spring or hydraulic bias allowing the obstructing object to be cleared.

We claim.

1. In a forage harvester having a mobile main frame, a cutterhead housing, and an axially transverse rotary cutterhead mounted in the housing and having a plurality of knives generating a cylinder as the cutterhead rotates, the improvement comprising: a shear bar having a straight longitudinal cutting edge disposed forwardly of and adjacent to the cutterhead periphery parallel to the cutterhead axis; means mounting the shear bar on the forage harvester frame for shifting between a normal, undeflected position wherein the cutting edge is disposed immediately adjacent to the cutterhead and a downwardly deflected position wherein it permits the downward tangential discharge of foreign bodies entrained in the crop material before the foreign bodies entirely enter the cutterhead, said mounting means including a pair of parallel arms pivotally mounted on the forage harvester frame on coaxial pivot means and carrying the shear bar and resiliently yieldable means operatively associated with the shear bar for biasing the shear bar toward its undeflected position in all the positions of the shear bar; and a plurality of feed rolls mounted on the frame parallel to and forwardly of the cutterhead and including a lower feed roll adjacent the forward side of the shear bar, when the shear bar is in its undeflected position, the feed rolls being adapted to feed crop material over the shear bar and radially into the cutterhead, the cutterhead knives moving downwardly past the shear bar to reduce crop material moving over the shear bar.

2. The invention defined in claim 1 wherein the yieldable means comprises a spring means operative between the frame and to shear bar.

3. The invention defined in claim 1 wherein the pivot means are coaxial with the cutterhead.

4. The invention defined in claim 1 wherein the pivot means are coaxial with said lower feed roll.

5. The invention defined in claim 1 wherein the resiliently yieldable means comprises collapsible hydraulic cylinder means.

6. The invention defined in claim 1 and including a releasable latching means mounted on the frame and engageable with the shear bar after a predetermined amount of shear bar movement from its underflected position to hold the shear bar from returning to its undeflected position.

7. The invention defined in claim 6 wherein the yieldable means comprises a spring means operative between the frame and the shear bar.

8. In a forage harvester having a mobile main frame, a cutterhead housing, and an axially transverse rotary cutterhead mounted in the housing and having a plurality of knives generating a cylinder as the cutterhead rotates, the improvement comprising: a shear bar having a straight longitudinal cutting edge disposed forwardly of and adjacent to the cutterhead periphery parallel to the cutterhead axis; means mounting the shear bar on the forage harvester frame for shifting between a normal, undeflected position wherein the cutting edge is disposed immediately adjacent to the cutterhead and a downwardly deflected position wherein it permits the downward tangential discharge of foreign bodies entrained in the crop material before the foreign bodies entirely enter the cutterhead, said mounting means including a pair of guide means mounted on the frame and respectively receiving the opposite ends of the shear bar to guide the movement of the shear bar between its alternate positions and resiliently yieldable means operatively associated with the shear bar for biasing the shear bar toward its undeflected position in all the positions of the shear bar; and a plurality of feed rolls mounted on the frame parallel to and forwardly of the cutterhead and including a lower feed roll adjacent the forward side of the shear bar, when the shear bar is in its undeflected position, the feed rolls being adapted to feed crop material over the shear bar and radially into the cutterhead, the cutterhead knives moving downwardly past the shear bar to reduce crop material moving over the shear bar.

9. The invention defined in claim 8 wherein the resiliently yieldable means comprises a pair of compression springs respectively associated with the respective guide means.

* * * * *